US007815887B2

(12) United States Patent
Schäfer et al.

(10) Patent No.: US 7,815,887 B2
(45) Date of Patent: Oct. 19, 2010

(54) CONDUCTIVE NONWOVEN FABRIC

(75) Inventors: Werner Schäfer, Birkenau (DE); Kurt Jörder, Weinheim (DE); Hans Rettig, Laudenbach (DE); Karim Salama, Weinheim (DE); Achim Bock, Weinheim (DE); Silke Wagener, Recklinghauser (DE); Axel Helmbold, Hofheim (DE)

(73) Assignee: Carl Freudenberg KG, Weinheim (DE)

( * ) Notice: Subject to any disclaimer, the term of this patent is extended or adjusted under 35 U.S.C. 154(b) by 505 days.

(21) Appl. No.: 11/834,547

(22) Filed: Aug. 6, 2007

(65) Prior Publication Data
US 2008/0075940 A1    Mar. 27, 2008

Related U.S. Application Data

(63) Continuation of application No. 10/149,398, filed as application No. PCT/EP01/11194 on Sep. 27, 2001, now abandoned.

(30) Foreign Application Priority Data
Oct. 11, 2000 (DE) ................... 100 50 512

(51) Int. Cl.
*D01F 9/12* (2006.01)
(52) U.S. Cl. ............... 423/447.4; 423/447.8; 264/29.2; 442/354; 442/408; 442/411; 442/414; 442/415; 28/103; 28/104
(58) Field of Classification Search ............ 423/447.4, 423/447.8; 264/29.2; 28/103–104
See application file for complete search history.

(56) References Cited

U.S. PATENT DOCUMENTS

| | | | |
|---|---|---|---|
| 3,367,851 | A | 2/1968 | Filreis et al. |
| 3,960,601 | A | 6/1976 | Schulz |
| 4,505,797 | A | 3/1985 | Hodgdon et al. |
| 5,334,446 | A | 8/1994 | Quantrille et al. |
| 5,649,982 | A | 7/1997 | Halliop |
| 5,853,429 | A | 12/1998 | Heine et al. |
| 6,416,896 | B1 | 7/2002 | Tamaru et al. |

FOREIGN PATENT DOCUMENTS

| | | |
|---|---|---|
| EP | 0187163 | 7/1986 |
| EP | 0304825 | 3/1989 |
| EP | 0330179 | 8/1989 |
| EP | 0651452 | 5/1995 |
| EP | 0791974 | 8/1997 |
| JP | 6477624 | 3/1989 |
| JP | 6477625 | 3/1989 |
| JP | 5266773 | 10/1993 |
| JP | 6123050 | 5/1994 |
| JP | 7326384 | 12/1995 |
| JP | 9326256 | 12/1997 |
| JP | 2000-170069 | 6/2002 |
| JP | 2002536565 | 10/2002 |
| WO | 0047816 | 1/2000 |
| WO | 0104980 | 1/2001 |

*Primary Examiner*—Lynda Salvatore
(74) *Attorney, Agent, or Firm*—Grossman, Tucker, Perreault & Pfleger, PLLC

(57) ABSTRACT

The invention relates to a conductive nonwoven fabric that is carbonized and/or graphitized and possesses a bending rigidity <8 taber, a density of 0.1 g/m$^3$ to 0.5 g/m$^3$, a thickness of 80 μm to 500 μm, and an electrical conductivity of 10 to 300 S/cm in the nonwoven fabric strip and 30 to 220 S/cm$^2$ perpendicular to the nonwoven fabric strip.

19 Claims, No Drawings

CONDUCTIVE NONWOVEN FABRIC

CROSS-REFERENCE TO RELATED APPLICATIONS

This application is a continuation of U.S. application Ser. No. 10/149,398 filed Sep. 30, 2002, now abandoned and published Jun. 12, 2003 as United States Patent Application Publication No. US2003/0109189, which is a National Stage Completion of PCT/EP01/11194 filed Sep. 27, 2001, which claims priority to DE 100 50 512.0 filed Oct. 11, 2000, the teachings of which are incorporated herein by reference.

FIELD OF THE INVENTION

The invention relates to a conductive nonwoven fabric.

BACKGROUND INFORMATION

Conductive nonwoven fabrics are used as gas diffusion layers in membrane electrode assemblies (MEAs) for PEM (proton exchange membrane) fuel cells and should be electron conductive and gas-permeable. These nonwoven fabrics should also have channel structures for transporting away water that is formed during a reaction when operating fuel cells, and should possess an inherent rigidity at a limited thickness. Furthermore, these nonwoven fabrics should have a good surface smoothness at least on one side.

Two-dimensional textile materials, such as conductive woven fabrics or wet-laid nonwoven fabrics, may be used as starting materials for gas diffusion layers. Nonwoven fabrics having a thickness of 0.3 to 0.5 mm are referred to in Japanese Patent Application No. 06/123050, these fabrics including carbonizable polymer fiber materials, such as polyacrylic nitrile (PAN) or oxidized polyacrylic nitrites, with a mass per unit area of 100 to 200 g/m². To achieve the required electrical conductivity, these textile fabrics are carbonized at temperatures between 1000 and 2100° C., whereby a carbon content of approximately 90 to 96% is achieved. A reduction in mass per unit area by 30 to 60 weight-percent is connected with the carbonization, i.e. graphitization process. Usually, these fabrics, which are now conductive, are rigid and demonstrate a relatively open structure. The woven fabrics or nonwoven fabrics may be impregnated or coated with dispersions of conductive particles, such as graphite or carbon black, to achieve the required rigidity and to improve the conductivity in the X, Y, and Z direction, and subsequently to press them to achieve a high degree of surface smoothness.

Furthermore, Japanese Patent Application No. 10/777624 and Japanese Patent Application No. 10/777625 refer to the production of gas diffusion layers directly from carbon fibers in a wet-laying process, so that subsequent carbonization of the precursor fibers is unnecessary. In this connection, polyvinyl alcohol (PVA) solutions or polyethylene terephthalate (PET) substrates may be used as a binder for the carbon fibers. Subsequently, the hydrophobic properties of the gas diffusion layer may still be adjusted by finishing them with a hydrophobization agent, such as polytetrafluoroethylene (PTFE) dispersions and subsequent sintering.

It is believed that methods for the production of gas diffusion layers for PEM fuel cells are disadvantageous in that they may not be rolled up for transport and processing and must be filled with conductive fillers, to achieve the required conductivity values.

SUMMARY OF THE INVENTION

It is an object of the present invention to provide a conductive nonwoven fabric that overcomes the disadvantages described above.

To achieve this object, a conductive nonwoven fabric is carbonized and/or graphitized and possesses a bending rigidity <8 taber, a density of 0.1 g/m³ to 0.5 g/m³, a thickness of 80 µm, to 500 µm, and an electrical conductivity of 10 to 300 S/cm in the nonwoven fabric strip and 30 to 220 S/cm² perpendicular to the nonwoven fabric strip.

DETAILED DESCRIPTION

An exemplary conductive nonwoven fabric according to the invention is obtained from preoxidized fibers as a precursor stage for carbon fibers that are mixed, for example, with up to 30 wt. % of a precursor fiber that serves as a binder fiber, as well as up to 30 wt. % of a water-soluble fiber with a fiber titer of 0.5 to 6.7 dtex, to form a fiber fleece with a mass per unit area of 60 to 300 g/m², by bonding of the fiber fleece with high-pressure fluid jets at pressures of 100 to 300 bar, compression of the bonded fiber fleece by 50 to 90% of its starting thickness by calendaring, and carbonization and/or graphitization under an inert gas atmosphere, at 800° C. to 2500° C. The conductive nonwoven fabric obtained in this manner demonstrates a channel structure in the direction of the layer thickness of the nonwoven fabric. The preoxidized fibers and, if applicable, the binder fibers and water-soluble fibers, are mixed homogeneously and deposited to form a fiber sheet. The fiber sheet, with a mass per unit area of 30 to 300 g/m², is passed to a bonding unit, in which the fibers are swirled and intertangled by high-energy water jets, at pressures of 100 to 300 bar. After this treatment, a part of the fibers demonstrates an orientation in the direction of the Z direction (thickness) of the nonwoven fabric.

For example, the conductive nonwoven fabric may be one in which 80 to 90 wt.-% of a mixture of binder fibers and preoxidized fibers in a weight ratio of 0:1 to 1:3 and 10 to 20 wt.-% of a water-soluble fiber with a fiber titer of 0.8 to 3.3 dtex are used. This composition of the fibers and their fineness result in conductive nonwoven fabrics with a porosity of 70 to 95. For example, the conductive nonwoven fabric may be one in which two different water-soluble fibers are used, one of which is water-soluble at temperatures of 10 to 40° C. and the other of which is water-soluble at temperatures of 80 to 120° C. By using fibers with different water solubilities, the fibers in the temperature range of 10 to 40° C. are already dissolved out of the fiber fleece during the water-jet bonding process, and defined channels are formed in the nonwoven fabric layer, allowing improved gas permeability and improved removal transport of the water of reaction in the gas diffusion layer produced from them. The fibers that are not soluble in water until a temperature range of 80 to 120° C. remain in the bonded nonwoven fabric and become binder fibers in the wet state, because of their stickiness. For this purpose, the nonwoven fabric is passed through and compressed by a calendar while it is still wet.

For example, the conductive nonwoven fabric may be one in which the ratio of the water-soluble fibers relative to one another is 3:1 to 1:3. The rigidity of the gas diffusion layer and its porosity may be adjusted with this ratio.

A conductive nonwoven fabric including several fiber layers with different pore sizes may be used, in which the fibers of the individual layers possess different titers. The progressive build-up of the conductive nonwoven fabric from several fiber layers promotes the transport reaction to the proton exchange membrane and the removal transport of the water of reaction that is formed.

Conductive nonwoven fabrics, in which partially crosslinked phenolic resin fibers, polyester and/or polypropylene fibers are used as the precursor fibers, homopolymers, copolymers, and/or terpolymers of PAN (polyacrylic nitrile) fibers, cellulose fibers and/or phenolic resin fibers are used as the preoxidized fibers, and PVA (polyvinyl alcohol) fibers are used as the water-soluble fibers may be used. The gas diffusion layer obtained from a nonwoven fabric made of these fibers may be carbonized well and easily adjusted with regard to its pore distribution and its rigidity.

A conductive nonwoven fabric that is hydrophobized by application of a hydrophobization agent, such as PTFE (polytetrafluoroethylene) may also be used. The transport processes at the phase border surfaces may be further improved by hydrophobization.

According to the invention, the conductive nonwoven fabric is produced in such a manner that
  a) preoxidized fibers, if necessary, in a mixture with up to 30 wt. % carbonizable precursor fibers serving as binder fibers, and up to 30 wt. % water-soluble fibers, are mixed,
  b) laid to form a fiber fleece with a mass per unit area of 60 to 300 g/m², using the dry method, and using stripper and/or carding machines,
  c) bonded with high-pressure fluid jets, at pressures of 100 to 300 bar,
  d) predried to a residual moisture of 10 to 50%,
  e) calendared at contact pressures of 20 to 1000 N/cm² and temperatures of 100 to 400° C., and
  f) carbonized and/or graphitized at temperatures between 800 and 2500° C.

For example, production may be performed in that in step
  a) fibers with a fiber titer of 0.8 to 3.3. dtex and a fiber length of 30 to 70 mm are used,
  b) fiber fleeces with a mass per unit area of 30 to 180 g/m² are laid,
  e) calendaring takes place at a contact pressure of 40 to 700 N/cm² and a temperature of 180 to 300° C., and
  f) carbonization as well as graphitization takes place at a temperature between 1000 and 1800° C.

In step e) at least two nonwoven fabric layers are calendared together.

The invention will be explained in greater detail below, using examples.

EXAMPLE 1

A preoxidized PAN fiber (oxidized PAN fiber—OPF) with a fiber titer of 0.8 dtex and a fiber length of 60 mm is laid on a carding system to form a fiber fleece with a mass per unit area of 100 g/m². The fiber fleece is passed to a bonding unit, in which the fibers are tanglelaced and intertangled with one another by high-energy water jets on both sides, at pressures of approximately 100 bar in the first step and approximately 170 bar in the second step, in each instance. The nonwoven fabric is predried to a residual moisture of 15 to 20%. While still wet, the nonwoven fabric is passed to a felt band calendar and compressed at a temperature of approximately 220° C. and at 20 bar. As a result of the calendaring process, the thickness of the water-jet-bonded nonwoven fabric is reduced from 0.8 mm to a thickness of 0.4 to 0.5 mm. Subsequently, the nonwoven fabric is passed to a carbonization unit, in which carbonization occurs under a nitrogen atmosphere at approximately 1000 to 1400° C. The resulting conductive nonwoven fabric has a crosswise conductivity, i.e., in the layer plane, of 12 S/cm in the machine direction, 18 S/cm crosswise to the machine direction, at a bending rigidity of <1 taber and an air permeability of 6.0 l/m²sPa, and its through conductivity, i.e. perpendicular to the layer plane, is 90 S/cm², where this value was determined at a surface pressure of 4.07 bar. Its density is 0.16 g/cm³, the porosity is 91%, and the average pore diameter is 25 µm.

EXAMPLE 2

A two-layer fiber fleece made up of a first fleece layer with a mass per unit area of 50 g/m², made up of 80 wt.-% OPF with a fiber titer of 1.2 dtex and a fiber length of 60 mm, as well as 20 wt.-% of a TTP fiber (textile tow precursor) with a fiber titer of 1.7 dtex and a fiber length of 40 mm, and a second fleece layer with a mass per unit area of 50 g/m², made up of 80 wt.-% OPF with a fiber titer of 0.8 dtex and a fiber length of 60 mm, as well as 20 wt.-% of a TTP fiber with a fiber titer of 0.8 dtex and a fiber length of 40 mm, which were cross-laid on a carding system, is passed to a bonding unit, in which the fibers are tanglelaced and intertangled with one another by high-energy water jets on both sides, at pressures of approximately 120 bar in the first step and approximately 190 bar in the second step, in each instance. The nonwoven fabric is predried to a residual moisture of approximately 10%. While still in the wet state, the nonwoven fabric is passed to a roller calendar with a steel roller and a roller coated with cotton, where the temperature of the steel roller was approximately 210° C. and that of the roller coated with cotton was approximately 150° C., and compressed at a line pressure of 80 kp/cm². As a result of the calendaring process, the thickness of the water-jet-bonded nonwoven fabric is reduced from 0.8 mm to a thickness of 0.16 mm. Subsequently, the nonwoven fabric is passed to a carbonization unit, in which carbonization occurs under a nitrogen atmosphere at approximately 1000 to 1400° C. The resulting conductive nonwoven fabric demonstrates a crosswise conductivity, i.e. in the layer plane, of 54 S/cm in the machine direction, 54 S/cm crosswise to the machine direction, at a bending rigidity of 1 taber and an air permeability of 2 l/m²sPa, and its through conductivity, i.e. perpendicular to the layer plane, is 120 S/cm², where this value was determined at a surface pressure of 4.07 bar. Its density is 0.32 g/cm³, the porosity is 82%, and the average pore diameter is 15 µm.

EXAMPLE 3

A preoxidized PAN fiber (oxidized PAN fiber—OPF) with a fiber titer of 0.8 dtex and fiber lengths of 60 mm is laid on a carding system to form a fiber fleece with a mass per unit area of 100 g/m². The fiber fleece is passed to a bonding unit in which the fibers are tanglelaced and intertangled with one another by high-energy water jets on both sides, at pressures of approximately 100 bar in the first step and approximately 170 bar in the second step, in each instance. The nonwoven fabric is predried to a residual moisture of 15 to 20%. While still wet, the nonwoven fabric is passed to a calendar made up of a steel roller and a plastic roller and compressed at a temperature of approximately 350° C. and at 250 kp/cm². As a result of the calendaring process, the thickness of the water-jet-bonded nonwoven fabric is reduced from 0.9 mm to a thickness of 0.14 mm. Subsequently, the nonwoven fabric is passed to a carbonization unit in which carbonization occurs under a nitrogen atmosphere at approximately 1000 to 1400° C. The resulting conductive nonwoven fabric demonstrates a crosswise conductivity, i.e. in the layer plane, of 93.7 S/cm in the machine direction, 73 S/cm crosswise to the machine direction, at a bending rigidity of <1 taber and an air permeability of 1.0 l/m²sPa, and its through conductivity, i.e. perpendicular to the layer plane, is 195 S/cm², where this value was determined at a surface pressure of 4.07 bar. Its density is 0.43 g/cm², the porosity is 78%, and the average pore diameter is 7 µm.

What is claimed is:

1. A method for producing conductive nonwoven fabric strip, bonded only by hydroentanglement, containing at least one of carbonized and graphitized fibers, the method comprising:
forming a fiber sheet of preoxidized fibers having a mass per unit area of 30 to 300 g/m²;
bonding the fiber sheet by high pressure jets at pressures of 100 to 300 bar;
compressing the bonded nonwoven fiber fabric by calendaring by 50 to 90% of its starting thickness;
carbonization and/or graphitization of the bonded nonwoven fabric under an inert gas atmospheres at 800° C. to 2500° C. to thereby form a conductive nonwoven fabric;
said nonwoven fabric having a bending rigidity of less than 8 taber, a density of between 0.1 g/cm³ and 0.5 g/cm³, a thickness between 80 µm and 500 µm and an electrical conductivity of between 10 and 300 S/cm in the nonwoven fabric strip and between 30 and 220 S/cm² perpendicular to the nonwoven fabric strip.

2. The method of claim 1 wherein the fiber sheet includes said preoxidized fibers in combination with up to 30 wt.-% of a plurality of carbonizable precursor fibers that act as binding fibers and up to 30 wt.-% of water soluble fibers.

3. The method of claim 1 comprising, after bonding by high pressure water jets, predrying the bonded fiber sheet to a residual moisture between 10 and 50% and calendaring at a contact pressure of between 20 and 1000 N/cm² and at a temperature of between 100 and 400° C.

4. A conductive nonwoven fabric, including water soluble fibers, bonded only by hydrogen entanglement, containing at least one of carbonized and graphitized fibers, the conductive nonwoven fabric having a bending rigidity of less than 8 taber, a density of between 0.1 g/cm³ and 0.5 g/cm³, a thickness of between 80 µm and 500 µm, and an electrical conductivity of between 10 and 300 S/cm in a nonwoven fabric strip and between 30 and 220 S/cm² perpendicular to the nonwoven fabric strip obtained by laying up preoxidized fibers as a precursor stage for carbon fibers to form a fiber sheet having a mass per unit area of 30 to 300 g/m², bonding the fiber sheet by high-pressured fluid jets at pressures of 100 to 300 bar, compression of the bonded nonwoven fiber fabric by calendaring by 50 to 90% of its starting thickness, and at least one of carbonization and graphitization under an inert gas atmosphere at 800° C. to 2500° C., wherein the water-soluble fibers include two different water-soluble fibers, one of the two different water-soluble fibers being water-soluble at temperatures of between 10 and 40° C. and another of the two different water-soluble fibers being water-soluble at temperatures of between 80 and 120° C.

5. A conductive nonwoven fabric, including water soluble fibers and one of carbonized and graphitized fibers, the conductive nonwoven fabric having a bending rigidity of less that 8 taber, a density of between 0.1 g/cm³ and 0.5 g/cm³, a thickness of between 80 µm and 500 µm, and an electrical conductivity of between 10 and 300 S/cm in a nonwoven fabric strip and between 30 and 220 S/cm² perpendicular to the nonwoven fabric strip wherein the water-soluble fibers include two different water-soluble fibers, one of the two different water-soluble fibers being water soluble at temperatures of between 10 and 40° C. and another one of the two different water-soluble fibers being water-soluble at temperatures of between 80 and 120° C., wherein the nonwoven fabric is bonded only by hydroentanglement.

6. A conductive nonwoven fabric one of carbonized and graphitized fibers, the conductive nonwoven fabric having a bending rigidity of less than 8 taber, a density of between 0.1 g/cm³ and 0.5 g/cm³, a thickness of between 80 µm and 500 µm, and an electrical conductivity of between 10 and 300 S/cm in a nonwoven fabric strip and between 30 and 220 S/cm² perpendicular to the nonwoven fabric strip wherein the conductive nonwoven fabric is produced by mixing a plurality of preoxidized carbon fibers with up to 30 wt. % of a plurality of water-soluble fibers having fibers titers of between 0.5 and 6.7 dtex, laying up the preoxidized carbon fibers and the water-soluble fibers to form a fiber sheet having a mass per unit area of between 30 and 300 g/m², bonding the fiber sheet using high-pressure fluid jets at pressures of between 100 and 300 bar, compressing the fiber sheet by between 50% and 90% of a starting thickness of the fiber sheet by calendaring, and one of carbonizing and graphitizing the fiber sheet in an inert gas atmosphere at between 800° C. and 2500° C. wherein the water-soluble fibers include two different water-soluble fibers, one of the two different water-soluble fibers being water-soluble at temperatures of between 10 and 40° C. and another one of the two different water-soluble fibers being water-soluble at temperatures of between 80 and 120° C., wherein the nonwoven fabric is bonded only by hydroentanglement.

7. The fabric according to claim 5, wherein a ratio of the two different water soluble fibers relative to one another is between 3:1 and 1:3.

8. The fabric according to claim 6, wherein a ratio of the two different water soluble fibers relative to one another is between 3:1 and 1:3.

9. A conductive nonwoven fabric, including two different water soluble fibers, bonded only by hydrogen entanglement, containing at least one of carbonized and graphitized fibers, the conductive nonwoven fabric having a bending rigidity of less than 8 taber, a density of between 0.1 g/cm³ and 0.5 g/cm³, a thickness of between 80 µm and 500 µm, and an electrical conductivity of between 10 and 300 S/cm in a nonwoven fabric strip and between 30 and 220 S/cm² perpendicular to the nonwoven fabric strip obtained by laying up preoxidized fibers as a precursor stage for carbon fibers to form a fiber sheet having a mass per unit area of 30 to 300 g/m², bonding the fiber sheet by high-pressured fluid jets at pressures of 100 to 300 bar, compression of the bonded nonwoven fiber fabric by calendaring by 50 to 90% of its starting thickness, and at least one of carbonization and graphitization under an inert gas atmosphere at 800° C. to 2500° C. wherein a ratio of the water-soluble fibers relative to one another is 3:1 through 1:3.

10. A conductive nonwoven fabric, bonded only by hydrogen entanglement, containing at least one of carbonized and graphitized fibers, the conductive nonwoven fabric having a bending rigidity of less than 8 taber, a density of between 0.1 g/cm³ and 0.5 g/cm³, a thickness of between 80 µm and 500 µm, and an electrical conductivity of between 10 and 300 S/cm in a nonwoven fabric strip and between 30 and 220 S/cm² perpendicular to the nonwoven fabric strip obtained by laying up preoxidized fibers as a precursor stage for carbon fibers to form a fiber sheet having a mass per unit area of 30 to 300 g/m², bonding the fiber sheet by high-pressured fluid jets at pressures of 100 to 300 bar, compression of the bonded nonwoven fiber fabric by calendaring by 50 to 90% of its starting thickness, and at least one of carbonization and graphitization under an inert gas atmosphere at 800° C. to 2500° C., wherein the fabric is comprised of at least two layers having different pore sizes, wherein fibers of the layers possess different titers.

11. The method of claim 2 wherein two different water soluble fibers are used, one of which is water soluble at temperatures of 10° C. to 40° C. and the other at temperatures of 80° C. to 120° C.

12. The method of claim 11 wherein the ratio of water soluble fibers to each other is in the range from 3:1 to 1:3.

13. The method of claim 1 wherein said non-woven fabric is contructed of a plurality of fibrous layers having different pore sizes, the fibers of the individual layers having different linear densities.

14. The method of claim 13 wherein at least two fibrous web layers are consolidated by high pressure jets of fluid are connected together by calendaring.

15. The method of claim 1 wherein said conductive non-woven fabric contains 80-90% by weight of a mixture of precursor fibers and oxidized fibers in a weight ratio of 0:1 to 1:3 and 10 to 20% by weight of a water soluble fiber having fiber linear densities of 0.8 to 3.3 dtex.

16. The method of claim 1 wherein said oxidized fibers comprise any one of homo, co- and/or terpolymers of polyacrylonitrile fibers, cellulose fibers and/or phenolic resin fibers.

17. The method of claim 11 wherein the water soluble fibers comprise poly(vinyl alcohol).

18. The method of claim 2 wherein said precursor fibers include any one of partially crosslinked phenolic resin fibers, polyester and/or polypropylene.

19. The method of claim 1 wherein said nonwoven fabric is hydrophobicized by application of poly(tetrafluoroethylene).

* * * * *